Nov. 24, 1959    G. PFEIFER    2,913,884
SHAFT COUPLING
Filed Aug. 8, 1957

United States Patent Office 2,913,884
Patented Nov. 24, 1959

2,913,884

SHAFT COUPLING

Gustav Pfeifer, Munich, Germany, assignor to Bayerische Motoren Werke Aktiengesellschaft, Munich, Germany, a corporation of Germany Application August 8, 1957, Serial No. 677,091

Claims priority, application Germany August 18, 1956

9 Claims. (Cl. 64—13)

This invention relates to a new shaft coupling element.

Rubber disks of various designs have been used to bring about an elastic coupling between shafts transmitting rotary motion. A widely accepted shaft coupling adapted for connecting the power supply shaft to the drive shaft in motorcycles and other vehicles comprises a circular rubber disk having a plurality of equidistant circular openings arranged on a circle near and concentrical with the circumference of the disk. Cylindrical protuberances disposed on a circle near and concentrical with the circumference of each shaft project and fit into the circular openings of the disk from both sides in an alternate fashion thus firmly engaging the coupling element.

In operation, shaft couplings are subjected to forces which produce surface and contact pressure. On the other hand, shaft couplings have to handle angular and parallel misalignments of the shafts which result in flexing and twisting of the coupling element. Finally, the relative movements between the projections or pins on the shafts and the disk openings receiving the same tend to cause abrasion. For these reasons, the conventional rubber shaft couplings deteriorate rather rapidly.

Various attempts have been made to increase the service life of such shaft couplings. Thus, it has been proposed to reinforce the circular openings by the insertion of sockets consisting of hard rubber or rubberized fabrics. However, these sockets did not materially reduce the wear of the coupling member. According to another design, a metal disk having the same shape and openings as the rubber disk is imbedded in the coupling member. These metal-rubber coupling members, however, exert an excessive surface pressure on the cylindrical projections or pins on the shafts with which they are engaged. Finally, it has been proposed to enclose each pair of opposite openings receiving the shaft pins with an 8-shaped fabric structure. However, coupling elements of such a design are not satisfactory either since they are apt to break in the areas between the openings.

It is, therefore, a primary object of the present invention to provide a shaft coupling element which is devoid of the shortcomings of the heretofore used couplings. Another object of the invention is to provide a shaft coupling member which has a long service life. A further object of the invention is to provide a shaft coupling element which is highly flexible and capable of handling angular as well as parallel misalignments of the shafts. Still further objects will become apparent from the following description with reference to the accompanying diagrammatic drawings which illustrate certain preferred coupling elements made in accordance with and embodying this invention.

Figure 1:
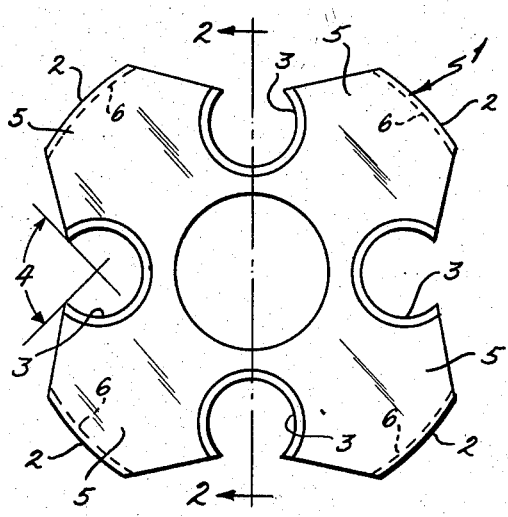
Figure 1 is a plan view showing a coupling element constructed in accordance with one embodiment of the present invention.

In accordance with this invention, generally speaking, the foregoing objects and others are accomplished by providing a shaft coupling element which comprises a disk made of a relatively hard elastic material, said disk having a plurality of circular openings disposed on a circle near and concentric with its circumference and a plurality of cutouts removing portions of the walls of said openings. More specifically, the present invention provides a shaft coupling element which comprises a disk made of an elastic material having a Shore hardness of between about 65° and about 95°, said disk having a plurality of circular openings disposed on a circle near and concentric with its circumference, and a plurality of cutouts, said cutouts having the form of pie-shaped segments whose apices lie on diameters passing through the centers of said openings and whose arc-shaped bases lie on the periphery of said disk.

In a specific embodiment of the invention, the openings provided for engaging the shafts form regularly spaced open circles whose cutout sectors include an angle of about 90° and the arcs of the sectors between the cutouts have a length of about 1/16 to about 1/7 of the circumference of the disk.

In addition to the cutouts intercepting the openings provided for engaging the shafts, the coupling member of the invention may have regularly spaced smaller cutouts positioned along the circumference of the disk. These smaller cutouts may have any suitable shape, such as that of a half moon.

The coupling element of the invention may be made of any elastic material having sufficient hardness, such as natural or synthetic rubber. Particularly desirable properties are obtained if the Shore hardness of the disk material ranges from about 65° to about 95°. In a preferred embodiment of the invention, the coupling element is made of polyurethane rubber having a Shore hardness within the range of about 65° to about 95° since it has been found that the use of polyurethane rubber results in an increased durability.

It is, of course, possible to provide the disk coupling element of the invention with reinforcements of fabric, metal or other materials.

The invention is based on the discovery that the service life of shaft coupling disks of the type herein described depends upon three factors. In the first place, the disk must have great flexural strength in order to be capable of withstanding the continual flexing and twisting forces acting thereon. In the second place, the disk must be abrasion resistant since the movements of the shaft pins in the disk openings tend to rub off material. In the third place, the disk must be capable of withstanding the forces acting in the direction of the circumference. In order to meet all these requirements, the material of the disk should combine two opposite properties: While flexing and twisting can be handled best by a soft, elastic material, the circumferential forces, which result in surface and contact pressures, call for a hard, rigid material. Thus far there exists no material which in the form of an ordinary disk stands up under these different forces even if the coupling element is provided with reinforcements.

It has been found, however, that shaft coupling disks of the above-indicated hardness and shape stand up even under the severest conditions of operations. Thanks to the hardness of the material of construction, which is capable of taking high surface and contact pressures, the shaft coupling disks of the invention withstand the circumferential forces. On the other hand, the particular shape of the shaft coupling disks of the invention accounts for the high degree of flexibility required to handle angular and parallel misalignments. In other words, a material of construction which owing to its hardness can take a high specific load is given a shape which makes the shaft coupling disk of the invention soft and elastic toward misalignments.

Referring more particularly to the drawings, the disk 1 (Figure 1) may be made from one elastic material or it may be composed of several materials including a reinforcing fabric or the like. The Shore hardness of the disk 1 ranges from about 65° to about 95°. The disk 1 has four regularly spaced pie-shaped cutouts which extend into the regularly spaced circular openings 3 adapted for receiving the shaft pins. The missing arcs of the open circles formed by the openings 3 define the right angle 4. Each of the arcs 2 of the sectors 5 between the cutouts has a length of $\frac{1}{16}$ to $\frac{1}{7}$ of the circumference of the disk 1.

Figure 2:
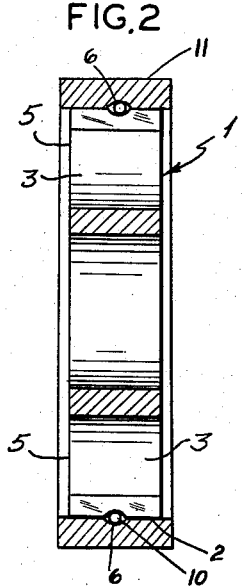
Figure 2 is a cross-sectional view taken along line II—II of Figure 1.

The disk 1 is surrounded by a protective casing or socket of metal 11 as shown in Figure 2 and kept under pressure by an annular spring 10 disposed in the peripheral groove 6 under the metal casing.

Figure 3:
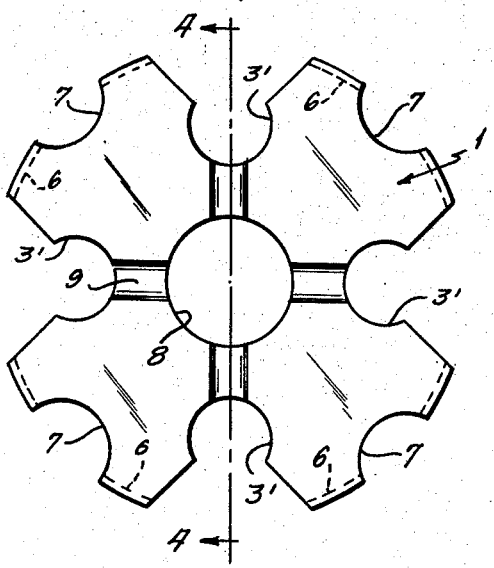
Figure 3 is a plan view of another embodiment of the present invention.
Figure 4:
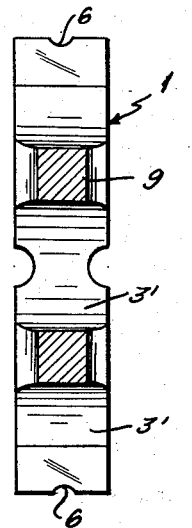
Figure 4 is a cross-sectional view taken along line IV—IV of Figure 3.

The shaft coupling disk illustrated in Figures 3 and 4 has the small arc-shaped cutouts 7 in the sectors between the main cutouts extending into the openings 3'. The disk body 1' presents web-shaped portions 9 extending radially between the central boring 8 and the openings 3' and having a thickness inferior to that of the disk body 1'.

As stated hereinabove, polyurethane rubber (see, for example, U.S. Patents 2,620,516; 2,621,166; 2,729,618; 2,764,565 and 2,778,810) is a particularly suitable material of construction for the shaft couplings of the invention. The following example describes a procedure adapted to make a polyurethane rubber of the required hardness but it is to be understood that any other suitable formulation may also be utilized.

*Example*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 300 parts by weight of naphthylene-1,5-diisocyanate are added at 135° C. while stirring. As soon as the temperature starts to drop, 70 parts by weight of butylene glycol-1,4 are stirred into the mixture at about 135° C. The resulting mixture is poured into a mold and maintained therein at a temperature of about 110° C. for about 24 hours to form a polyurethane rubber having the following characteristics:

| | |
|---|---|
| Tensile strength _____kg./cm.² | 381 |
| Elongation at break _____percent | 625 |
| Permanent set _____do____ | 12 |
| Tear resistance _____kg./cm.² | 96 |
| Resiliency _____ | 39 |
| Load at 300% elongation _____ | 86 |
| Hardness _____ | 81 |

Although certain representative embodiments and details have been shown for the purpose of illustrating this invention, it will be apparent to those skilled in the art that various changes and modifications may be made therein without departing from the spirit and scope of the invention except as set forth in the claims.

Thus, the thickness and the diameter of the disk, the number of circular openings and cutouts, and other characteristics may be varied according to requirements.

What is claimed is:

1. A shaft coupling element which comprises a disk made of a relatively hard elastic material, said disk having a central circular bore, a plurality of circular openings disposed on a circle near and concentric with its circumference and a plurality of cutouts removing portions of the walls of said openings, and web shaped portions extending radially between said central bore and said circular openings.

2. A shaft coupling element which comprises a disk made of an elastic material having a Shore hardness of between about 65° and about 95°, said disk having a plurality of circular openings disposed on a circle near and concentric with its circumference and a plurality of cutouts, said cutouts having the form of pie-shaped segments whose apices lie on diameters passing through the centers of said openings and whose arc-shaped bases lie on the periphery of said disk.

3. A shaft coupling element as defined in claim 2 wherein said openings form regularly spaced open circles whose cutout sectors include an angle of about 90° and the arcs of the sectors between the cutouts have a length of about $\frac{1}{16}$ to about $\frac{1}{7}$ of the circumference of the disk.

4. A shaft coupling element as defined in claim 2 wherein said disk has a plurality of regularly spaced smaller cutouts positioned along its periphery in addition to the cutouts intercepting said openings.

5. A shaft coupling element as defined in claim 2 wherein said disk has a plurality of regularly spaced half moon-shaped smaller cutouts positioned along its periphery in addition to the cutouts intercepting said openings.

6. A shaft coupling element as defined in claim 2 wherein said disk is surrounded by an annular spring and a protective metal casing.

7. A shaft coupling element as defined in claim 2 wherein said disk has a central bore and web-shaped portions extending radially between said central bore and said circular openings, and having a thickness inferior to that of said disk.

8. A shaft coupling element which comprises a disk made of polyurethane rubber having a Shore hardness of between about 65° and about 95°, said disk having a plurality of regularly spaced circular openings disposed on a circle near and concentric with its circumference and a plurality of regularly spaced cutouts, said cutouts having the form of pie-shaped segments whose apices lie on diameters passing through the sectors of said openings and whose arc-shaped bases lie on the periphery of said disk.

9. A shaft coupling as defined in claim 8 wherein said disk is surrounded by an annular spring and a protective metal casing.

References Cited in the file of this patent

UNITED STATES PATENTS

| | | |
|---|---|---|
| 1,417,432 | Walker _____ | May 23, 1922 |
| 1,460,337 | Holmes _____ | June 26, 1923 |
| 1,611,954 | Schell _____ | Dec. 28, 1926 |
| 1,615,138 | Runyon _____ | Jan. 18, 1927 |
| 1,935,390 | Brown _____ | Nov. 14, 1933 |
| 2,515,001 | Guy _____ | July 11, 1950 |